Figure 1:
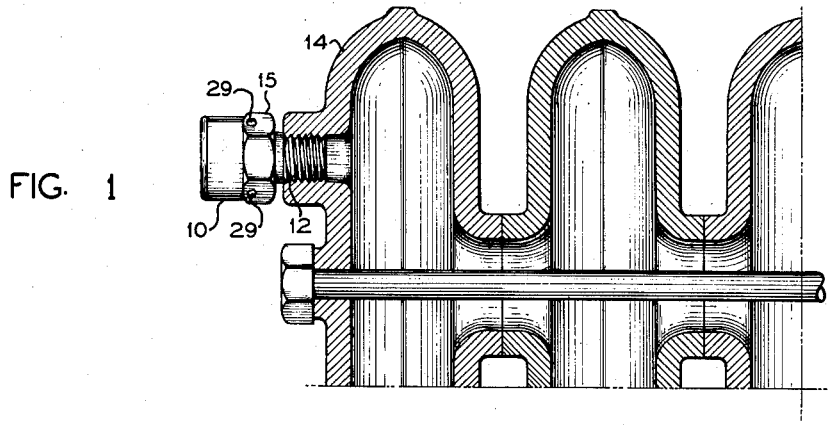

Nov. 15, 1955  M. O. THRUSH  2,723,676
AUTOMATIC AIR VENT VALVE
Filed Sept. 12, 1951

INVENTOR.
M. O. THRUSH
BY
A. Yates Dowell
ATTORNEY

United States Patent Office 2,723,676
Patented Nov. 15, 1955

2,723,676
AUTOMATIC AIR VENT VALVE

Marquis O. Thrush, Peru, Ind., assignor to H. A. Thrush & Company, Peru, Ind., a corporation of Indiana Application September 12, 1951, Serial No. 246,273

4 Claims. (Cl. 137—197)

This invention relates to fluid distribution and particularly to the distribution and control of fluid in connection with a closed system containing water or other liquid having entrapped air therein and used in heating systems as the heat carrying medium.

Specifically the invention relates to an automatic air vent valve for use in connection with one of the radiators or other heat exchange elements of heating systems for permitting the escape of entrapped air, but which valve is constructed to close automatically and prevent the escape of water or other liquid heating medium after the entrapped air is discharged.

Air vent valves of various kinds have been employed for venting air from radiators or the like, however, these have not been fully satisfactory for numerous reasons including the fact that they were constructed of separable parts, some of which are easily lost, they required accurate adjustment by skilled labor and substantially constant attention.

It is an object of the invention to provide a unitary automatic air vent valve in which the parts are permanently united so that they are not likely to be lost and the device rendered inoperative, as well as a valve having a hygroscopic material for controlling flow and a valve which can be shipped in closed or seated position to prevent damage to the respective parts but which can be installed and with a slight turn of a predetermined amount the parts can be released for full automatic operation.

Another object of the invention is to provide relatively simple, inexpensive valve structure including hygroscopic material which will permit entrapped air to escape readily but when liquid follows, the hygroscopic material will expand and shut-off the escape of such liquid with a definite relation between the hygroscopic material and the chamber within which it is contained therefore providing uniformity of valve structure as well as of the amount of expansion required for preventing flow of liquid, thereby eliminating the human element in the assembly of the parts of the valve.

A further object of the invention is to provide a valve which can be adjusted to provide a fixed clearance with the seating member and adjusting portions integral, as well as the incorporation in the chamber of such valve of expansion and sealing means.

A still further object of the invention is to provide a valve in which the valve seating member can be tightened or loosened to shut-off or allow automatic operation without disturbing the fixed position of the expansible liquid flow controlling material or without interfering with the automatic operation.

Figure 2:
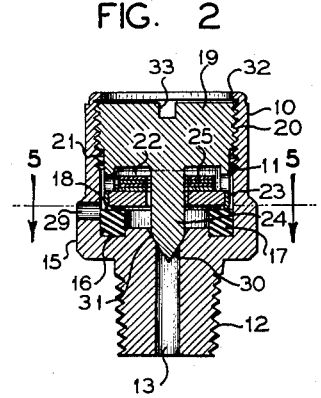
Figure 3:
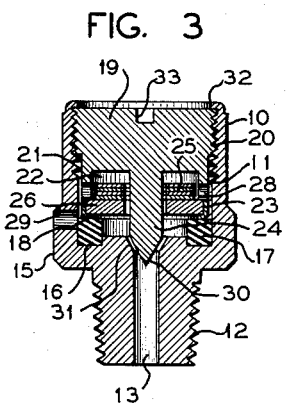
Figure 4:
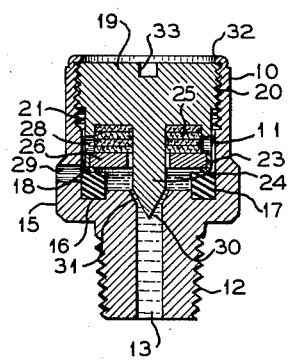
Figure 5:
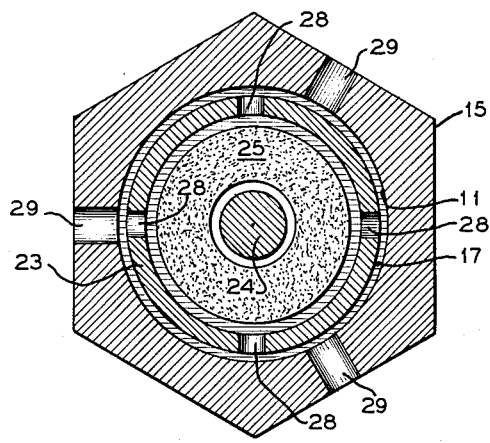

Further objects and advantages of the invention will be apparent from the following description taken in conjunction with the accompanying drawings, wherein:

Fig. 1 is a longitudinal section of a radiator or heat exchange unit illustrating one application of the invention;

Fig. 2, a vertical section;

Fig. 3, a similar section with parts in a different position from that of Fig. 2;

Fig. 4, a similar vertical section with the parts in a further operative position;

Fig. 5, a section on the line 5—5 of Fig. 2; and

Figure 6:
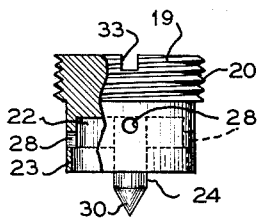

Fig. 6, a side elevation partly in section of the adjustable valve member.

Briefly stated a valve is provided comprising a housing with inlet and discharge ports and a movable or adjustable manner. Within the housing also is hygroscopic material which controls the flow of fluid through such ports. The adjustable member has an integral valve projection which is adjusted tight against its seat until after installation and ready for use. When it is unseated entrapped air can escape through the valve until water reaches the hygroscopic material and it expands and shuts off the flow through the ports. When the water recedes drying of this material occurs and air can then flow through the valve.

The invention comprises a valve body or housing 10 having a chamber in its upper portion and a threaded stem 12 provided with a compartment or a bore 13 for the passage of fluid therethrough. The stem 12 or lower portion of the valve body 10 is provided with external threads by means of which the valve may be attached to cooperating threads of a radiator 14, tightening being facilitated by the provision of polygonal wrench engaging surfaces 15 on the exterior of the valve body.

Fluid entrapped within the radiator is adapted to escape through the bore 13 of the valve, and in order to control this and permit entrapped air to escape but prevent liquid from escaping, the chamber 11 in the upper portion of the valve is provided with an annular recess 16 in its bottom within which a resilient gasket 17 is received for engagement by the rolled over end 18 of an adjustable valve member in the form of a plug 19 having external threads 20 for cooperation with similar threads 21 around the interior of the upper inner wall portion 11 of the chamber.

The plug or valve member 19 is provided with an annular chamber 22 between an outer annular wall 23 and an axial projection 24 and within which is received and held a series of disks 25 of hygroscopic or expansible material, such disks being held in place by a brass washer 26 retained by means of an over turned reduced edge 18 of the wall 23. The inner edges of the disks 25 and washer 26 are spaced from the projection 24 to permit flow of fluid around the same into the chamber 22 in which the hygroscopic disks are located so that such fluid may escape through radial ports 28 in the wall 23 and then through ports 29 in the wrench engaging portion 15 of the housing 10.

The axial projection 24 is provided with a tapered lower end 30 adapted to engage a tapered seat 31 in the upper end of the bore 13. In normal operation this tapered end 30 will be slightly spaced from such seat 31 so that fluid may enter the valve body 10 and come into contact with the hygroscopic disks 25.

During shipment the end of the axial projection valve 24 is preferably in contact with the tapered seat 31 in the inner end of the bore 13 and when the valve is installed it is moved slightly from such seat. In order to accomplish this, and retain the parts in similar relation, the upper end of the housing is provided with a turned over retaining flange 32. For rotation of the plug and axial variation of the position of the valve member within the valve housing a screw-driver slot 33 is formed in the outer end of such threaded valve plug 19. Thus, when the valve is in its operative position the plug 19 will be unscrewed and therefore open. During shipment the valve plug 19 will be threaded inwardly a small amount and the tapered end 30 of the valve member will rest tightly against the tapered seat 31.

In operation, after the valve is installed the discharge ports 28 and 29 will permit air entrapped within the radiator to pass through the bore 13 into the valve body 11 and then into the chamber 22, from this chamber through the ports 28 in the side wall 23 and be discharged through ports 29 in the wrench engaging portion 15 of the housing 10. This pathway will be open until such time as liquid comes into contact with the hygroscopic disks 25 within the chamber 22 whereupon these hygroscopic disks will expand as shown in Fig. 4 and flow through the openings 28 in the side wall 23 will be discontinued and will remain in such condition as long as the liquid is present but upon the lowering of the liquid from contact with the disks 25 they will shrink and permit the flow of air, the discharge ports being offset to facilitate admission of air and drying of the hygroscopic material.

This automatic air vent valve is relatively simple, being composed of two principal parts, one a housing having an axial passage or bore and the other a plug having a chamber with hygroscopic material therein and a projection for closing said bore during shipment of the valve. While the housing and the plug are two separate and independent units, the plug is adapted to be retained in the housing by an in-turned end of the latter. Further, due to the construction thereof a unitary non-separable article is provided which can be shipped without damage, readily adjusted and applied so that it will satisfactorily perform the function for which it was produced.

It will be obvious to those skilled in the art that various changes may be made in the invention without departing from the spirit and scope thereof and therefore this invention is not limited by that which is shown in the drawing or by that which is described in the specification, but only as indicated in the appended claims.

What is claimed is:

1. An automatic air vent valve comprising a housing having a chamber in its upper portion with an open end, the inner wall of the chamber being threaded, said housing having a threaded supporting stem with an axial bore for the passage of fluid therethrough, and with an external wrench engaging surface, said housing having an annular recess at the bottom of said chamber, a resilient gasket in said recess, an adjustable plug in said chamber with external threads cooperating with the threads of said chamber, said plug having an annular outer wall and an axial projection defining an annular chamber between the same, a series of disks of hygroscopic material of a nature to permit air to flow over the same but to expand and fill said annular chamber upon contact by liquid within said annular chamber, a retaining washer confining said disks within said chamber, means whereby said washer is secured in place, said axial projection having a tapered free end for closing the inner end of the bore of said supporting stem and adjustable for allowing flow through said bore and around said projection into said annular chamber onto said disks, the annular wall of said plug being provided with radial ports and the wall of said housing being provided with radial ports axially offset relative to said first ports, the wall forming the open end of said housing being turned over and serving to permanently retain said plug within said housing but permitting it to be axially adjusted so that said bore may be closed during shipment and installation but open for automatic operation of the valve thereafter.

2. An automatic air vent valve comprising a housing having a chamber in its upper portion and an annular recess at the bottom of said chamber, a resilient gasket in said recess, an adjustable plug in said chamber having an annular outer wall and an axial projection defining an annular chamber between the same, a series of disks of hygroscopic material of a nature to permit air to flow over the same but to expand and fill said annular chamber upon contact by liquid within said annular chamber, a retaining washer confining said disks within said annular chamber, means whereby said washer is secured in place, said axial projection having a tapered free end for closing the inner end of the bore of said supporting stem and adjustable for allowing flow through said bore and around said projection into said annular chamber onto said disks, the walls of said plug and said housing being provided with escape ports, and means for permanently retaining said plug within said housing but said plug being axially adjustable so that said bore may be closed during shipment and installation but open for automatic operation of the valve thereafter.

3. An automatic air vent valve comprising a housing having a chamber and a bore leading thereto, a resilient gasket in the bottom of said chamber, an adjustable member in said chamber adapted to engage said gasket said adjustable member having an axial projection with a tapered free end for closing the inner end of said bore and adjustable for allowing flow through said bore into said chamber, said adjustable member having a compartment therein, hygroscopic material in said compartment for permitting flow of air but preventing flow of liquid therethrough and means serving to permanently retain said adjustable member within said housing but permitting it to be adjusted so that said bore may be closed during shipment and installation but open for automatic operation of the valve thereafter.

4. An automatic air vent valve comprising a housing having a chamber and a bore leading thereto from the exterior, an adjustable member contained entirely within said chamber and having an axial projection with a free end adapted to extend into and close said bore, said adjustable member having a compartment through which fluid is adapted to flow communicating with said chamber and adjoining said projection, discharge means communicating between said compartment and the atmosphere, said adjustable member adjustably controlling the flow of fluid from said bore through said chamber and said compartment, hygroscopic material in said compartment for permitting fluid in the form of air to flow therethrough but preventing fluid in the form of liquid from flowing therethrough, and means confining said adjustable member within said housing by permitting it to be adjusted so that said bore may be closed during shipment and installation but open for automatic operation of the valve thereafter.

References Cited in the file of this patent
UNITED STATES PATENTS

| | | |
|---|---|---|
| 2,153,726 | Scoppola | Apr. 11, 1939 |
| 2,467,217 | Mikeska | Apr. 12, 1949 |
| 2,655,170 | Ferguson | Oct. 13, 1953 |